(12) United States Patent
Kajita

(10) Patent No.: US 8,782,647 B2
(45) Date of Patent: *Jul. 15, 2014

(54) INTELLIGENT RETRY METHOD USING REMOTE SHELL

(75) Inventor: Tsunehiro Kajita, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 180 days.

This patent is subject to a terminal disclaimer.

(21) Appl. No.: 13/410,866

(22) Filed: Mar. 2, 2012

(65) Prior Publication Data

US 2012/0167099 A1 Jun. 28, 2012

Related U.S. Application Data (63) Continuation of application No. 11/847,060, filed on Aug. 29, 2007, now Pat. No. 8,171,475.

(51) Int. Cl.
*G06F 9/44* (2006.01)
*G06F 11/00* (2006.01)
*G06F 15/16* (2006.01)

(52) U.S. Cl.
USPC ............................... 718/101; 714/2; 709/201

(58) Field of Classification Search
None
See application file for complete search history.

(56) References Cited

U.S. PATENT DOCUMENTS

| | | | |
|---|---|---|---|
| 5,946,463 | A | 8/1999 | Carr et al. |
| 6,356,951 | B1 | 3/2002 | Gentry, Jr. |
| 7,058,912 | B2 | 6/2006 | Katla et al. |
| 7,213,049 | B2 | 5/2007 | Felt et al. |
| 7,584,474 | B2 | 9/2009 | Gondi et al. |
| 7,774,780 | B2 | 8/2010 | Chow et al. |
| 7,796,589 | B2 | 9/2010 | Cohen et al. |
| 7,809,818 | B2 | 10/2010 | Plamondon |
| 2003/0212738 | A1 | 11/2003 | Wookey et al. |
| 2005/0050540 | A1 | 3/2005 | Shaughnessy et al. |
| 2007/0192503 | A1 | 8/2007 | McCollum et al. |
| 2007/0214457 | A1 | 9/2007 | Goyal et al. |
| 2009/0031293 | A1 | 1/2009 | Marsala et al. |

FOREIGN PATENT DOCUMENTS

| | | |
|---|---|---|
| JP | 10228450 | 8/1998 |
| JP | 10301875 | 11/1998 |

*Primary Examiner* — Qing Wu
(74) *Attorney, Agent, or Firm* — Mohammed Kashef; SVL IP Law (57) ABSTRACT

Method for issuing and monitoring a remote batch job, method for processing a batch job, and system for processing a remote batch job. The method for issuing and monitoring a remote batch job includes formatting a command to be sent to a remote server to include a sequence identification composed of an issuing server identification and a time stamp, forwarding the command from the issuing server to the remote server for processing, and determining success or failure of the processing of the command at the remote server. When the failure of the processing of the command at the remote server is determined, the method further includes instructing the remote server to retry the command processing.

15 Claims, 7 Drawing Sheets

INTELLIGENT RETRY METHOD USING REMOTE SHELL

CROSS-REFERENCE TO RELATED APPLICATIONS

This application is a continuation of U.S. patent application Ser. No. 11/847,060, entitled "Intelligent Retry Method Using Remote Shell" and filed Aug. 29, 2007, the disclosure of which is incorporated herein by reference in its entirety.

FIELD OF THE INVENTION

The invention is directed to a method using remote execute commands, e.g., remote shell commands, secure shell commands, program function using distributed component object model, to ensure completion of program, script, or commands on a remote server.

BACKGROUND OF THE INVENTION

A server/client-type system is a computing architecture generally implemented over a computer network and is well known for performing a wide range of applications. A client/server can be composed of a number of nodes, e.g., two (two-tiered system) or more, which allow devices to share files and resources. In this regard, client software, e.g., on a user's computer, can send data requests to one or more connected servers, e.g., direct connection or via the Internet. In turn, the servers, e.g., web, database, and/or mail server, can accept these requests, process them, and return the requested information to the client. Moreover, the servers can request completion of certain programs, scripts, or commands on another server.

A command line program, such as remote shell (RSH) can be utilized to execute shell commands and to achieve remote control between two servers. As an RSH command, which can be used in both a UNIX and Windows environment, identifies the host (remote server), user, and the desired command, shell commands can be executed as another user and/or on another computer across a computer network.

However, in executing synchronous processing between server systems using remote shell commands, network communication quality may often become a problem. For example, in the case of executing processing A on server 2 in response to a request from server 1 using a remote shell command, it may not be known, e.g., whether processing was successful on server 2 or whether the remote shell command failed. Moreover, as there is no way to know whether the execution status of processing A on server 2, retrial cannot be performed from server 1. Thus, one processing failure can lead to the failure of the entire task, and no context-sensitive recovery will be performed.

One proposed solution to the above-noted problem for ascertaining whether remote command or program have been processed is to execute interlock processing between a client and server via a network, e.g., an integrated job scheduler or a system management software. However, as these devices can be extremely expensive and difficult to use, e.g., detailed operational design is required as are the necessary skills to perform the design in order to actually introduce them into operation, a simpler solution is desired.

SUMMARY OF THE INVENTION

According to an aspect of the invention, a method is provided for issuing and monitoring a remote batch job. The method includes formatting a command to be sent to a remote server to include a sequence identification composed of an issuing server identification and a time stamp, forwarding the command from the issuing server to the remote server for processing, and determining success or failure of the processing of the command at the remote server. When the failure of the processing of the command at the remote server is determined, the method further includes instructing the remote server to retry the command processing.

In accordance with another aspect of the invention, a method is provided for processing a batch job. The method includes receiving a command for processing from a remote server, the command being formatted to include a sequence identification composed of an identification of the remote server and a time stamp, and informing the remote server of success or failure in processing the command. When the remote server is informed of the failure of the processing of the command, the instructions include receiving instructions from the remote server to retry the command processing.

According to still yet another aspect of the invention, a system is provided for processing a remote batch job. The system includes a first server structured and arranged to receive and process commands, a second server, remote from the first server, structured and arranged to format a command for processing in the first server to include a sequence identification composed of an identification of the second server and a time stamp, and a communication path coupling the first server to the second server. The first server includes a device to send a confirmation of success or failure in the processing of the command to the second server, and the second server includes a device for instructing the first server to retry processing of the command after receipt of the confirmation of failure in the processing of the command.

DETAILED DESCRIPTION OF EMBODIMENTS OF THE INVENTION

The invention is directed to a method based on a remote shell (RSH), a secure shell (SSH) or a program function using distributed component object model (DCOM). These commands are remote execute commands for script-based batch processing that normally come with an operating system (OS) and/or other similar remote control methods, enabling inexpensive, yet highly-reliable processing that responds to the deterioration of communication quality. While RSH can operate in both a UNIX and Windows environment, SSH may be limited to operating in a UNIX environment, while DCOM may be limited to operating in a Windows environment.

Thus, the invention provides a highly reliable remote batch job execution method by minimizing changes in commands of batch processing, including remote executions that have already been created, using existing remote communication technologies such as RSH, SSH, and DCOM.

Remote shell commands are generally executed in the format of RSH XXXXX YYYYY, in which XXXXX identifies a program, script, or command on the remote server and YYYYY identifies parameters, which can be multiple specified parameters. According to the invention, the parameters YYYYY for the scripts to be executed on the remote server side can be provided either with a sequence ID uniquely decided by the remote (or execution) server or with an execution time. Further, as the sequence ID can be processed and/or utilized by the remote server as a file name (e.g., ID file) on the remote server, a status inquiry can be made regarding the processing of the executing specified script on the remote server and the status can be recorded. As a result of this inquiry, a determination can be made whether processing invoked at a certain time has been successful, has failed, has not been executed, or is being executed, and processing may be performed accordingly.

The server invoking or issuing the command to the remote server can reissue the command so the remote server is instructed to continue retrying until processing of the command succeeds. This may be advantageous since there is no concern the same processing will be repeated when retrial is performed due to communication failure. Further, to ensure the appropriate command has been sent, a check digit of the character code of the script name or a parameter that follows RSH as the final parameter can be added to the command line. Thus, even in the event an incorrect command is sent, e.g., due to communication failure, execution on the remote server can be prevented or deterred. This allows the RSH execution server to execute the script and to concentrate on retrying correctly issued commands.

FIGS. 1-5 are flow diagrams showing processing steps of embodiments of the invention. FIGS. 1-5 may equally represent a high-level block diagram of components of the invention implementing the steps thereof. The steps of FIGS. 1-5 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention. The computer infrastructure may take the form of any conventional computer system, platform, or environment. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement.

Figure 1:
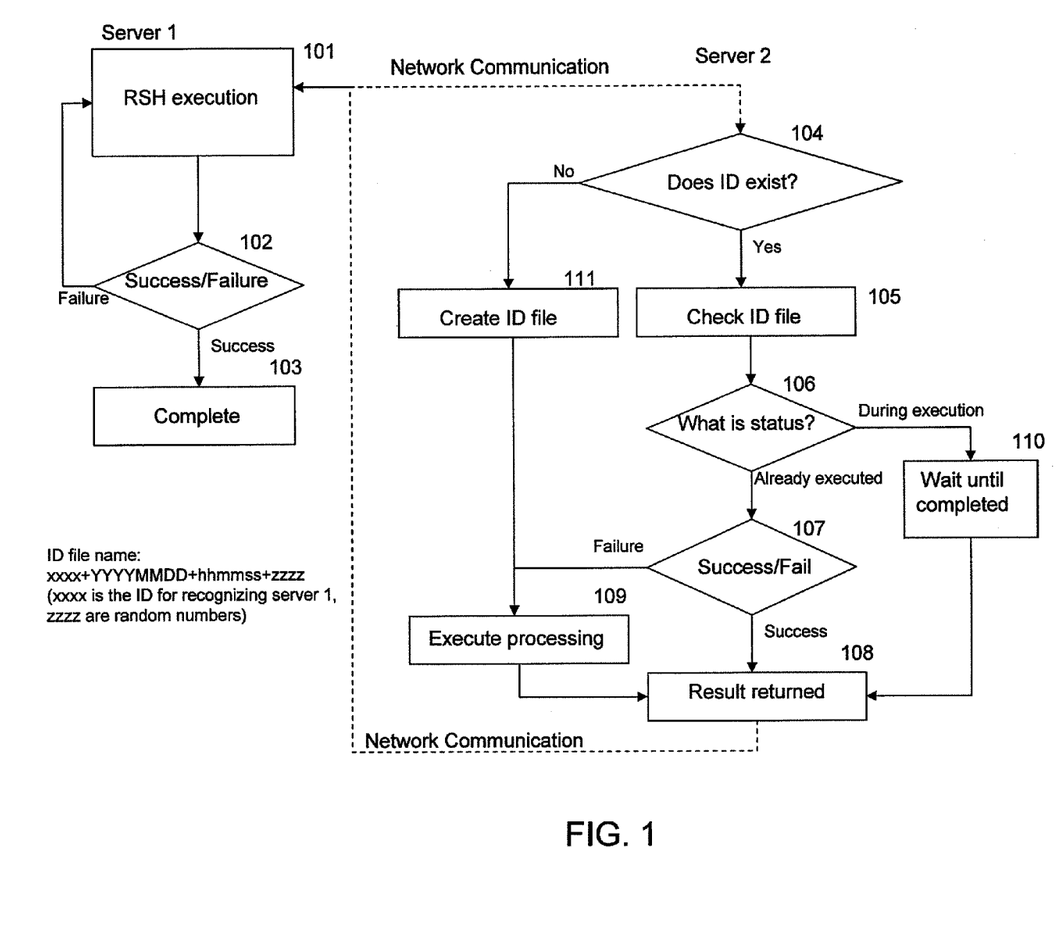
FIG. 1 illustrates an exemplary flow diagram of an overview of the invention.

A flow diagram of an exemplary overview of the invention is illustrated in FIG. 1 and can be implemented in an architecture composed of a server 1 for issuing remote execute commands, e.g., shell commands, and a server 2 for executing remote processing of the commands. The dashed line represents a network communication path between server 1 and server 2, which can be formed by any suitable communication path, including wireless communication, enabling an exchange of data between servers 1 and 2. When server 1 issues a program, script, or command, e.g., a remote shell (RSH) or secure shell (SSH) command in a UNIX environment at step 101, e.g., to be executed by server 2. In the UNIX environment, each OS command can be replaced with a user defined command or function (referred to as an "ALIAS function"). In a normal case, RSH is used on script code not on binary code, because RSH is an OS command not an application programming interface (API).

According to an embodiment of the invention, a sequence ID and/or a check digit can be added to the command line as an additional parameter. A number for the sequence ID may be selected to ensure its uniqueness among the multiple servers executing remote shell commands and multiple processing within the same server. Moreover, the sequence ID can be processed or utilized by server 2 as a file name, e.g., ID file, on server 2. By way of non-limiting example, the number for the sequence ID (or ID file on server 2) can be selected to be server ID (i.e., server 1)+year/month/date/hour/minute/second+random number(s). At step 102, a determination can be made whether the command was successfully executed. If successful, the process is completed at step 103, whereas, if not successful, the process may return to step 101, so an instruction to retry the command can be issued to remote server 2. Thus, in accordance with the invention, server 1 monitors the success/failure of the execution of the command processed in the remote server 2.

In server 2, a determination may be made at step 104 whether the ID file exists on server 2. In this regard, server 2 can process the sequence ID in the command line as a file name (ID file) to be found on server 2. When the ID file exists on server 2, the ID file is checked at step 105 and a status of the command is determined at step 106. If the command is already executed, the process can proceed to step 107 to determine the success or failure of the processing of the command. If the command is successfully executed, the result may be returned to server 1 at step 108. If the processing of the command failed, the processing is re-executed at step 109 and the result is returned to server 1 at step 108. If, at step 106, it is determined the command is being executed, the process can wait for completion of the command at step 110. In this regard, a polling of the contents of the ID file can be performed at intervals of a few seconds. The results can then be returned to server 1 at step 108. When the ID file at step 104 is determined not to exist, the ID file can be created at step 111 and the command may be processed at step 109. The result can then be returned to server 1 at step 108. Thus, server 2 informs server 1 of progress and successful completion of the remote execute command, thereby avoiding unnecessary commands for retrying.

Figure 2:
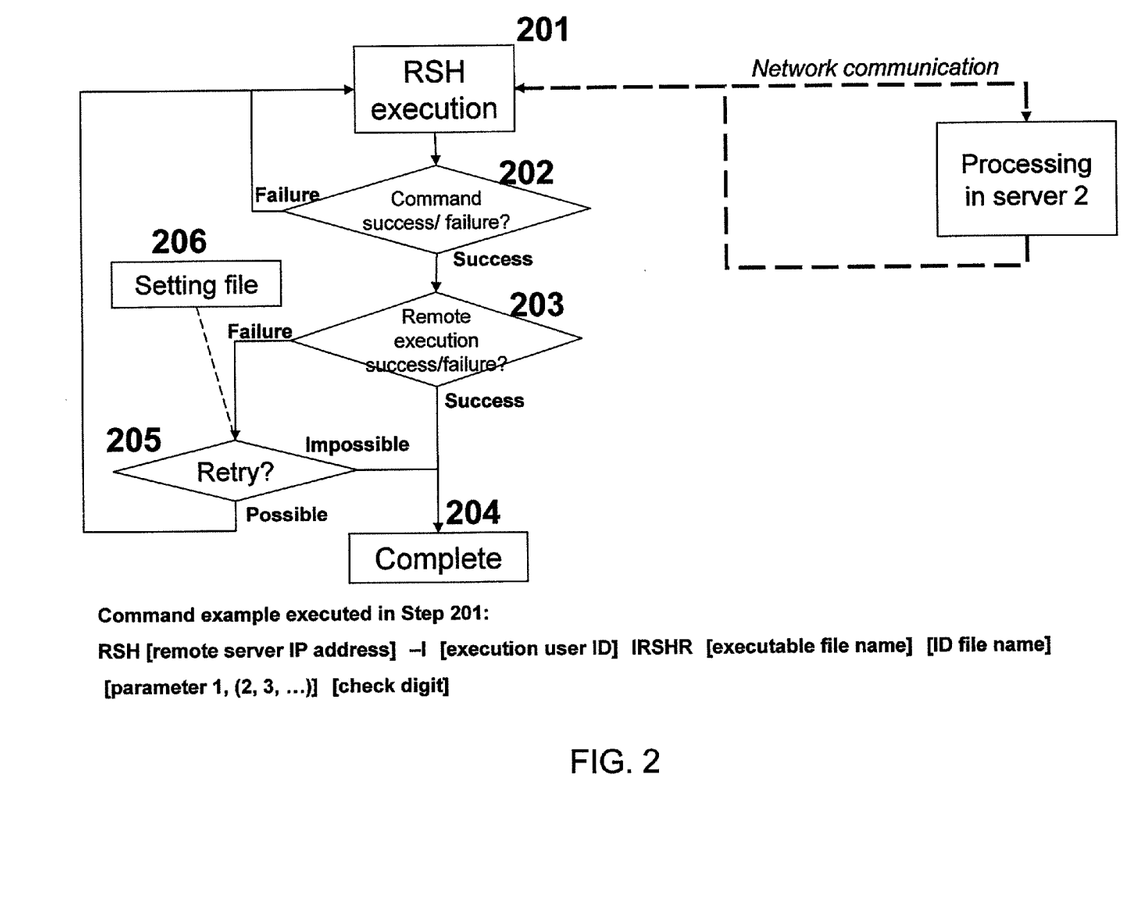
FIG. 2 illustrates an exemplary detailed flow diagram for a server issuing a remote execution command to an execution server according to the invention.

A more detailed flow of the internal processing of server 1 is illustrated in FIG. 2. At step 201, server 1 can issue a request for execution by server 2 of a program, script, or command in a UNIX environment, e.g., a remote execute command, such as a remote shell (RSH) or a secure shell (SSH) command. The command format for such a command can be, e.g., RSH [remote server IP address]-I IRSHR [execution user ID][executable file name][ID file name][parameter 1, (2, 3, . . . )][check digit]. Further, in a Windows environment, an upper level batch file can be utilized, and the command format can be, e.g., RSH [remote server IP address]-I [execution user ID] irshr.bat [executable file name][ID file name][parameter 1, (2, 3, . . . )][check digit]. The execution user ID can be for remote execution and placed on remote server 2, and the ID file name on server 2 can correspond to the sequence ID and the command can be formatted to include the ID file name and/or the check digit. Processing of the requested command is to be performed in server 2 and the success or failure of the command, i.e., was the command successfully issued to server 2, is determined at step 202. When network communication quality is poor, the flow represented by the dashed line, i.e., network communication, may fail. If the command is determined to have failed, e.g., due to poor transmission of data or any other reason, the process can return to step 201 to again request execution of the command, and retrying may be unconditionally performed until the command is successfully forwarded to remote server 2. If the command was successful, a determination can be made at step 203 whether the remote processing of the command at server 2 was successful. In this regard, server 1 is informed of the success or failure of the remote processing through receipt of a return code of the command from server 2, which can be utilized for determining the success or failure of the execution of the command at server 2. Thus, results of remote executions can be judged or evaluated by receiving remote server message output, e.g., through an echo command by command execution server 2. If successful, the process is completed at step 204. However, if execution fails, the process proceeds to step 205 to determine whether to retry executing the command. Further, the number of times to perform retrial or the execution timeout period can be specified in setting file 206. If the set number of tries has been used or an execution timeout period has been exhausted, it is no longer possible to retry executing the command, the process is completed at step 204. Should any tries or time remain, the process can return to step 201 to again request execution of the command.

Figure 3:
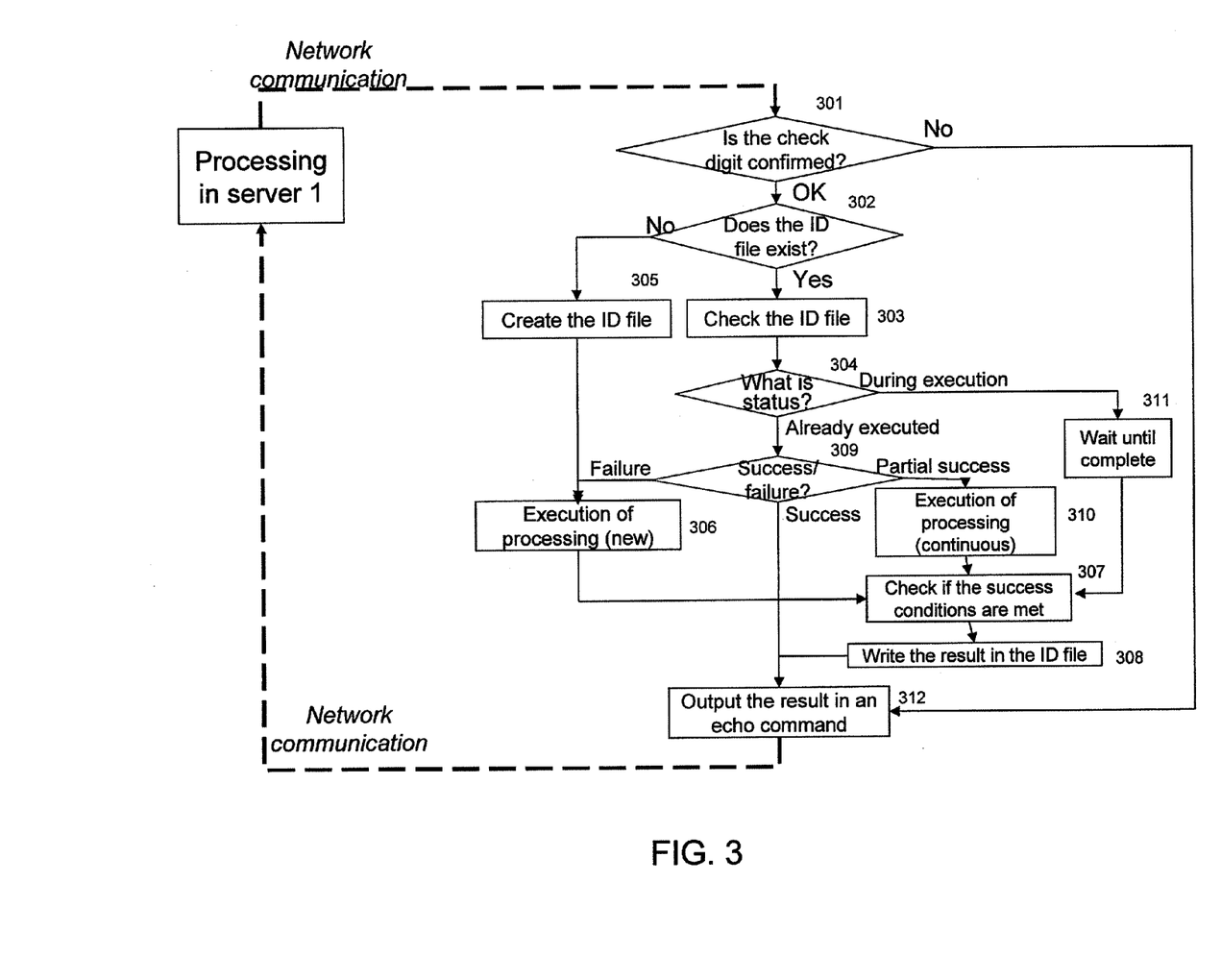
FIG. 3 illustrates an exemplary detailed flow diagram for the executing server processing the remote execution command from the issuing server according to the invention.

A detailed flow of the internal processing in server 2 is illustrated in FIG. 3. In server 2, all parameters may be picked up when executing a specified file (normally, a program, script, command, etc.) and the check digits in the command format can be checked in response to receiving the command, e.g., remote execute command, from server 1. At step 301, a determination is made whether the check digit is confirmed or valid, because no processing should be performed if the check digit is invalid. If determined to be invalid, the result is output by echo command to server 1 at step 312. The echo command can be utilized since remote shell cannot return the status of remote execution. By informing server 1 of the failure, server 1 can avoid making an incorrect decision even if commands cannot be exchanged properly due to the deterioration of communication quality. While it can be acceptable to misidentify a success as an error, misidentifying an error as a success should be avoided.

If the check digit is deemed correct in server 2, a determination is made at step 302 whether a temporary file exists corresponding to ID file (the sequence ID). If such a file exists, it may be assumed processing has at least begun. In this event, the ID file can be checked at step 303, and the status of the ID file can be determined at step 304, e.g., has the command already been executed or is the command being executed. If the ID file does not exist, processing can be considered to have not yet been executed and an ID file is created at step 305, and the processing may be executed at step 306. At step 307, the process checks to ensure the success conditions have been met, and thereafter, the processing result is recorded in the ID file at step 308, and the result is sent to server 1 by an echo command at step 312.

If a determination is made from step 304 that processing has already been executed, a determination of whether the processing was successful may be made at step 309. If successful, the result may be promptly sent to server 1 by an echo command at step 312. If the processing failed, the processing can be retried at step 306, and thereafter the process check to ensure the success conditions have been met at step 307, record the processing result in the ID file at step 308, and send the result to server 1 by an echo command at step 312. Moreover, depending on the processing content, e.g., cases such as multiple processing being bundled together, such that a portion of the processing may be successful, execution of the processing may continue at step 310 and, after confirming the conditions for considering the processing to be successful are finally met at step 307, a judgment of success or failure can be made and the appropriate result may be is promptly sent to server 1 by an echo command at step 312. If the determination from step 304 is the command is being executed, the process can wait for completion of the command at step 311. In this regard, a polling of the contents of the ID file can be performed at intervals of a few seconds. The results can be sent to server 1 by an echo command at step 312.

With the above exemplary flow, retrial can be performed as long as time permits or a number of retries remain the setting file in server 1 without concern as to the status of the communication with server 2 or the execution of unnecessary processing in server 2. In this way, the invention allows for an improvement in the reliability of remote processing.

Further, because processing dates of temporary files, i.e., ID files, on server 2 are made clear by their file names, it may be advantageous to collectively delete files 2 or 3 days later by simply filtering the files according to their file names. In this way, the invention can avoid forcibly deleting temporary files on server 2 when performing remote execution, which enables easier housekeeping than with the scheduler associated with the OS. Additionally, it can be helpful for analysis at the time of the occurrence of problems. Further, since only a minimal amount of information is contained in files, accumulated files will not take up an inordinate amount of disk space.

In an alternative embodiment, the invention can utilize a tentative program, script or command name referred to as an Intelligent Remote Shell (IRSH), which can be operated in both a UNIX and a Windows environment. When implemented in a UNIX environment, a command wrapper can be placed on both the command issuing side (server 1) and on the batch executing side (server 2) and no change may be required on parent scripts by the system administrator. When implemented in a Windows environment, a command wrapper can be placed on both the command issuing side (server 1) and on the batch executing side (server 2) and the RSH command statements of parent scripts that call for RSH commands can be changed to IRSH commands, so the system administrator may only need to change the command from "rsh" to "irsht.bat." The command wrapper automatically performs retrial of remote execution processing, realizing processing that can respond to RSH command failures resulting from the deterioration of communication quality. Further, the command wrapper can include a file for setting the number of times to perform retrial, the timeout period, the presence or absence of the batch for result confirmation on the remote execution side and to check the digit calculation method, etc. By editing this file, the processing method can be changed.

Figure 4:
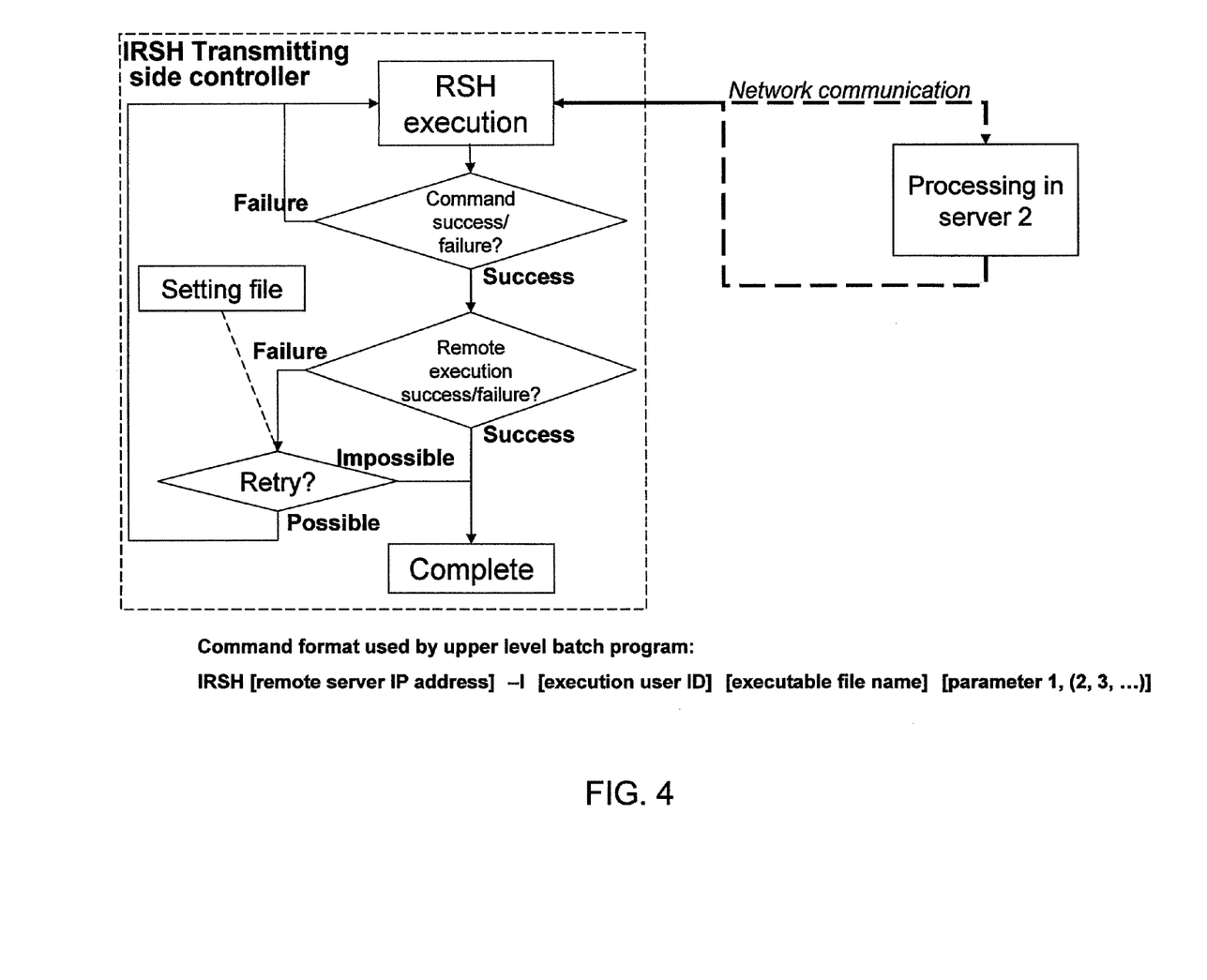
FIG. 4 illustrates another exemplary detailed flow diagram for a server issuing a remote execution command to an execution server according to the invention.

FIG. 4 illustrates an exemplary alternative detailed flow of the internal processing of server 1, and it is noted, with the exception of utilizing an IRSH command, the process is the same as illustrated in FIG. 2. The exemplary embodiment of FIGS. 4 and 5 can be implemented in either a UNIX or a Windows environment. In the UNIX environment, the ALIAS function can execute the command "alias rsh='irsht.sh'" such that the command rsh is replaced with irsht.sh, where 'irsht.sh' is a B-shell program that can actualize IRSH transmitting side controller, as illustrated in the dashed box in FIG. 4. Thus, no command replacement is needed in remote control batch program. In contrast to the UNIX environment, there is no ALIAS function in the Windows environment. Thus, a Windows batch file, e.g., 'rsht.bat', can be utilized to replace the RSH command with an IRSH command in source code or script code, e.g., 'irsht.bat' to actualize the IRSH transmitting side controller illustrated in FIG. 4. Server 1 issues a request for execution by server 2 of a program, script, or command, e.g., a shell command, such as a remote shell (RSH) or a program function using distributed component object model (DCOM). The command format can be, e.g., IRSH [remote server IP address]-I [execution user ID][executable file name][parameter 1, (2, 3, . . . )].

Figure 6:
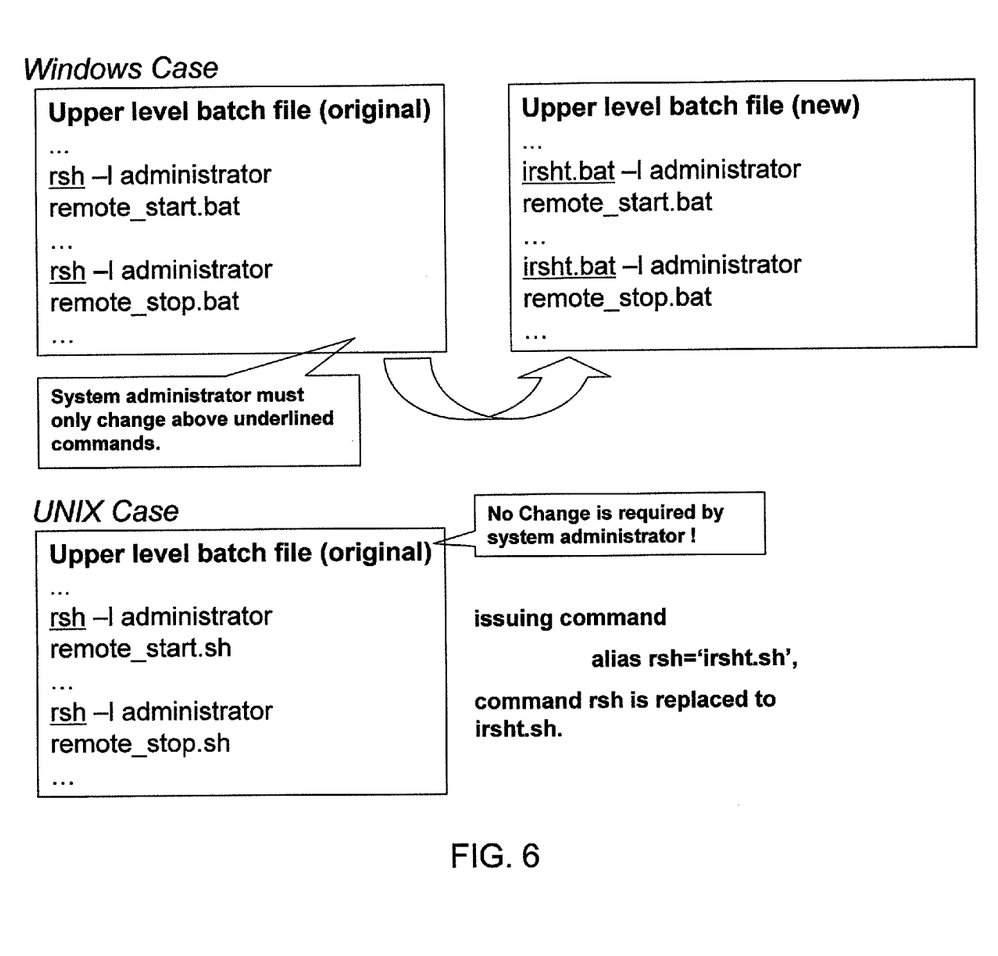
FIG. 6 illustrates the manner in which intelligent remote shell commands replace remote shell commands.

According to this exemplary embodiment, the script in server 1 requires almost no code rewriting, since the command wrapper performs the RSH processing in FIG. 2 through automatic retrial by simply rewriting the existing RSH command to IRSH, see, e.g., FIG. 6.

Figure 5:
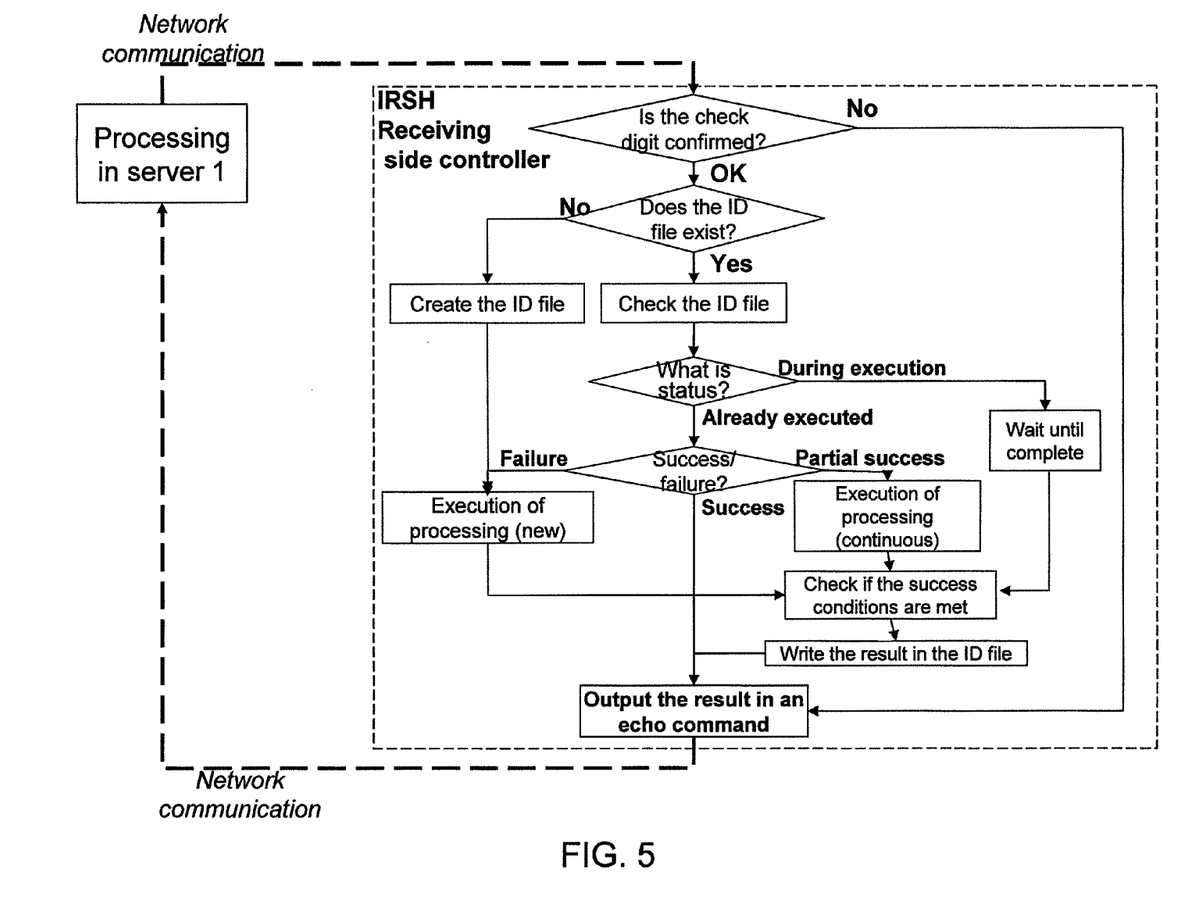
FIG. 5 illustrates another exemplary detailed flow diagram for the executing server processing the remote execution command from the issuing server according to the invention.

Further, the exemplary detailed flow of server 2 utilizing IRSH commands is illustrated in FIG. 5, in which an IRSH receiving side controller is illustrated within the dashed box. The exemplary flow illustrated in FIG. 5 corresponds to the flow illustrated in FIG. 3, except the flow utilizes the above-noted IRSH command rather than the RSH command of FIG. 3. With regard to processing in server 2, the remote execution batch processing and the result confirmation batch are put into server 2. Thus, the name of the program is only used in the IRSH transmitting side controller (see FIG. 5), such that remote control programs (upper batch program) do not use the program name, e.g., irshr.bat (for Windows) and irshr.sh (for UNIX). Therefore, the same script as is conventionally used can be utilized.

Figure 7:
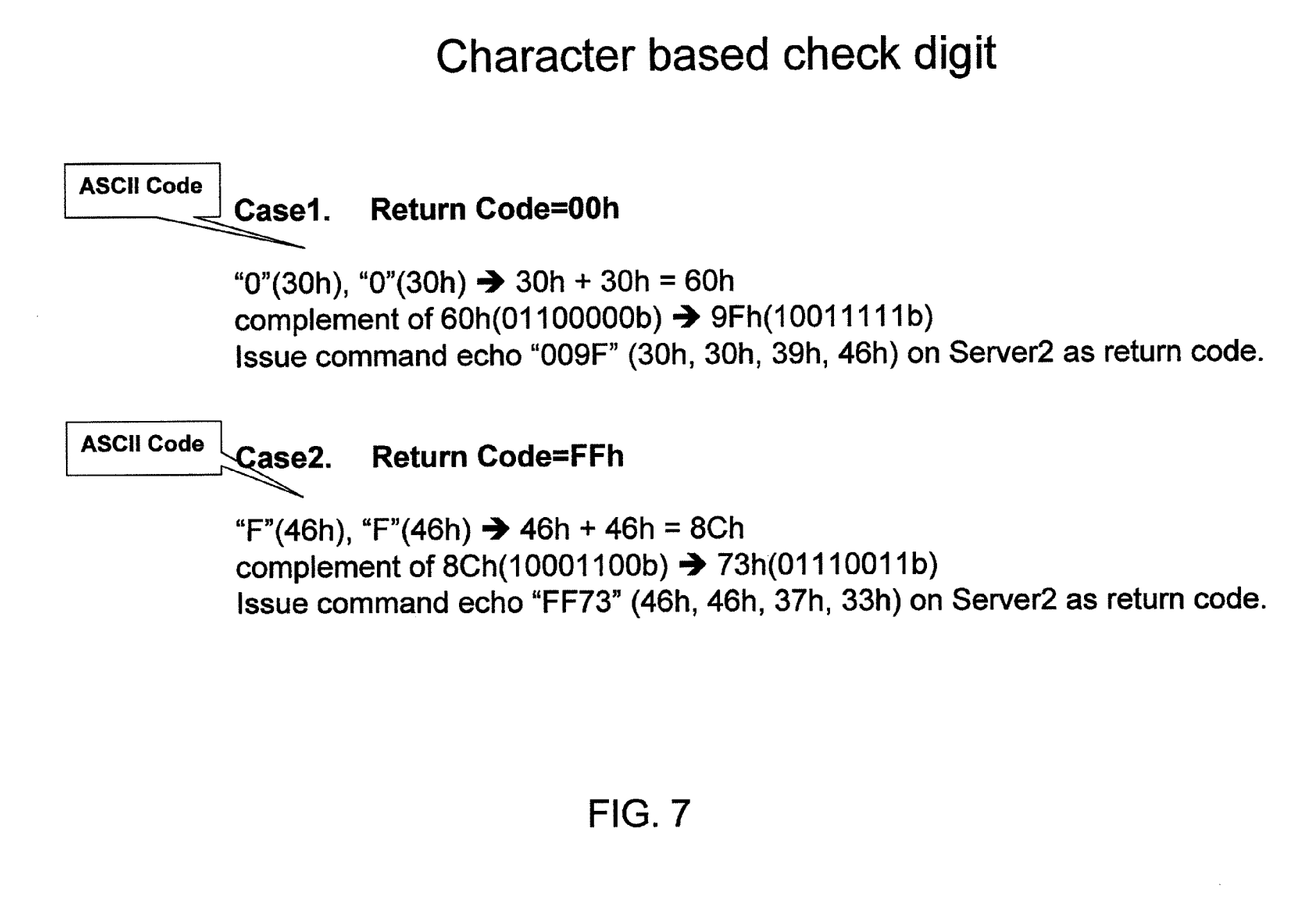
FIG. 7 illustrates examples of character based check digits.

FIG. 7 illustrates two exemplary cases for determination of a character based check digit. In a first case, the return code can be, e.g., 00h, and in a second case, the return code can be, e.g., FFh. A command echo may be issued on server 2 as the return code, so server 1 can receive the correct return code assuring the check digit is acceptable on server 2. The data length may be short enough so as to minimize transmission error under poor communication quality. Moreover, because of simple logic, the check digit procedure can be easily implemented in script language. It is further noted this check digit procedure can be utilized in a text based command, e.g., RSH command.

While the invention has been described in terms of embodiments, those skilled in the art will recognize that the invention can be practiced with modifications and in the spirit and scope of the appended claims.

What is claimed:

1. A computer program product for issuing and monitoring a remote batch job comprising:
   a non-transitory computer readable medium having computer readable program code embodied therewith, the computer readable program code comprising computer readable program code configured to:
   format a command to issue the remote batch job and include a sequence identification including an identification and a time stamp for identifying a corresponding storage unit for remotely storing a status of processing the command for the remote batch job;
   determine success or failure of the processing of the command for the remote batch job; and
   when the failure of the processing of the command for the remote batch job is determined, retrying the command processing for the remote batch job, wherein repeated processing of the command associated with the retry is prevented in response to the status within the storage unit indicating a prior successful processing of the command for the remote batch job.

2. The computer program product of claim 1, wherein the computer readable program code further comprises computer readable program code configured to:
   establish at least one of a number of retries and a retry timeout period, wherein the command processing for the remote batch job of failed command processing is retried to attain successful command processing until the number of retries or the retry timeout period is exhausted.

3. The computer program product of claim 1, wherein the computer readable program code further comprises computer readable program code configured to:
   determine a success or failure of issuing the command for the remote batch job.

4. The computer program product of claim 3, wherein the failure of issuing the command for the remote batch job comprises a communication failure.

5. The computer program product of claim 1, wherein the determining of success or failure of the processing of the command for the remote batch job comprises receiving a message through an echo command.

6. The computer program product of claim 1, wherein the command is formatted as one of a remote shell command, a secure shell command, or a program function using distributed component object model.

7. The computer program product of claim 1, wherein a command wrapper is placed on an issuing server providing the command for the remote batch job and a remote server performing the remote batch job, and the command is formatted as an IRSH function.

8. The computer program product of claim 7, wherein the command wrapper includes a file for setting at least one of a number of retries and a retry timeout period, and the command wrapper automatically instructs the remote server, when the failure of processing of the command at the remote server is determined, to retry the command processing.

9. A computer program product for processing a batch job comprising:

a non-transitory computer readable medium having computer readable program code embodied therewith, the computer readable program code comprising computer readable program code configured to:

receive a remotely generated command for processing, the command being formatted to include a sequence identification including an identification and a time stamp for identifying a local storage unit for storing a status of processing the command; and when a failure of the processing of the command occurs, retrying the command processing in response to remotely generated instructions, wherein repeated processing of the command associated with the retry is prevented in response to the status within the storage unit indicating a prior successful processing of the command.

10. The computer program product of claim 9, wherein the sequence identification identifies a storage unit including a file, the computer readable program code further configured to perform one of:

determining the success or failure based on processing of the file; and creating and processing the file and determining the success or failure based on processing of the file.

11. The computer program product of claim 9, wherein the computer readable program code further includes computer readable program code configured to:

send a message through an echo command informing of the success or failure in the processing of the command.

12. The computer program product of claim 9, wherein the command is formatted to further include a check digit, and the computer readable program code further comprises computer readable program code configured to:

confirm receipt of a valid check digit with the command.

13. The computer program product of claim 9, wherein the command is formatted as one of a remote shell command, a secure shell command, or a program function using distributed component object model.

14. The computer program product of claim 9, wherein the batch job is processed on an executing server, a command wrapper is placed on a remote server and the executing server, and the command is formatted as an IRSH function.

15. The computer program product of claim 14, wherein the command wrapper for the remote server includes a file for setting at least one of a number of retries and a retry timeout period, and the command wrapper for the executing server receives automatic instructions from the remote server, when the failure of processing of the command at the remote server is determined, to retry the command processing.

* * * * *